US012707254B2

(12) United States Patent
Ovesjö

(10) Patent No.: US 12,707,254 B2
(45) **Date of Patent: *Aug. 11, 2026**

(54) METHODS, WIRELESS DEVICE AND NETWORK NODE FOR HANDLING WIRELESS DEVICES HAVING DIFFERENT CAPABILITIES

(71) Applicant: TELEFONAKTIEBOLAGET LM ERICSSON (PUBL), Stockholm (SE)

(72) Inventor: Fredrik Ovesjö, Älvsjö (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

This patent is subject to a terminal disclaimer.

(21) Appl. No.: 19/255,194

(22) Filed: Jun. 30, 2025

(65) Prior Publication Data

US 2025/0330805 A1 Oct. 23, 2025

Related U.S. Application Data

(63) Continuation of application No. 18/868,286, filed as application No. PCT/SE2023/050488 on May 17, 2023.

(Continued)

(51) Int. Cl.
*H04W 8/24* (2009.01)
*H04W 8/18* (2009.01)

(Continued)

(52) U.S. Cl.
CPC ............. *H04W 8/22* (2013.01); *H04W 8/183* (2013.01); *H04W 8/24* (2013.01); *H04W 12/71* (2021.01)

(58) Field of Classification Search
CPC ......... H04W 8/24; H04W 8/22; H04W 24/06; H04W 76/10
See application file for complete search history.

(56) References Cited

U.S. PATENT DOCUMENTS

2008/0212503 A1 9/2008 Lipford et al.
2017/0134906 A1* 5/2017 Yoo ......................... H04W 8/22

(Continued)

FOREIGN PATENT DOCUMENTS

WO 2020145865 A1 7/2020

OTHER PUBLICATIONS

"3rd Generation Partnership Project; Technical Specification Group Radio Access Network; NR; Radio Resource Control (RRC) protocol specification (Release 17)", Technical Specification, 3GPP TS 38.331 V17.0.0 (Mar. 2022), 1221 Pages.

(Continued)

*Primary Examiner* — Congvan Tran
(74) *Attorney, Agent, or Firm* — Ericsson Inc.

(57) ABSTRACT

Disclosed is a method performed by a network node of a wireless communication network. The method includes receiving, from a User Equipment, UE, wirelessly connected to the network node, a chipset identifier indicating a type of chipset of the UE. The method further includes determining, based on the received chipset identifier, how to handle the UE, and communicating with the UE according to the determination. By receiving an identifier indicating the chipset type the UE is built on, the network node can adapt its handling of the UE depending on the chipset type.

20 Claims, 4 Drawing Sheets

Related U.S. Application Data

(60) Provisional application No. 63/345,688, filed on May 25, 2022.

(51) Int. Cl.
*H04W 8/22* (2009.01)
*H04W 12/71* (2021.01)

(56) References Cited

U.S. PATENT DOCUMENTS

| | | | | |
|---|---|---|---|---|
| 2017/0285621 | A1* | 10/2017 | Pradas | G06F 9/547 |
| 2018/0007559 | A1 | 1/2018 | Obaidi et al. | |
| 2020/0349103 | A1* | 11/2020 | Luong | G06F 13/4081 |
| 2022/0022029 | A1* | 1/2022 | Di Girolamo | H04W 60/00 |
| 2022/0046433 | A1 | 2/2022 | Bedekar et al. | |
| 2023/0403548 | A1* | 12/2023 | Zhu | H04W 24/10 |
| 2024/0187991 | A1* | 6/2024 | Rydén | H04W 24/10 |
| 2024/0204910 | A1* | 6/2024 | Soldati | H04W 76/20 |
| 2024/0314638 | A1* | 9/2024 | Soldati | H04B 7/0632 |
| 2025/0330373 | A1* | 10/2025 | Chen Larsson | G06N 20/00 |

OTHER PUBLICATIONS

“3rd Generation Partnership Project; Technical Specification Group Radio Access Network; NR; User Equipment (UE) radio access capabilities (Release 17)”, Technical Specification, 3GPP TS 38.306 V17.0.0 (Mar. 2022), 10 Pages.

Huawei, et al., “UE capability for CPAC and SCG (de)activation”, 3GPP TSG-RAN WG2#117-e, R2-2203380, Feb. 21-Mar. 3, 2022, 27 Pages, Online.

* cited by examiner

METHODS, WIRELESS DEVICE AND NETWORK NODE FOR HANDLING WIRELESS DEVICES HAVING DIFFERENT CAPABILITIES

RELATED APPLICATIONS

This application is a continuation of U.S. Non-Provisional patent application Ser. No. 18/868,286, filed Nov. 22, 2024, which was a 35 U.S.C. § 371 national phase filing of International Application No. PCT/SE2023/050488, filed May 17, 2023, which claims the benefit of and priority to U.S. Provisional Patent Application No. 63/345,688, filed May 25, 2022, entitled "METHODS, WIRELESS DEVICE AND NETWORK NODE FOR HANDLING WIRELESS DEVICES HAVING DIFFERENT CAPABILITIES," the disclosures of which are incorporated herein by reference in their entireties.

TECHNICAL FIELD

The present disclosure relates generally to methods, wireless device and network node for handling wireless devices having different capabilities. The present disclosure further relates to computer programs and carriers corresponding to the above methods, wireless devices and nodes.

BACKGROUND

The air interface of modern cellular technologies such as New Radio (NR), i.e., 5G, is very complicated with complex standard specifications covering a lot of functionality. Some of the functionality specified is mandatory for the wireless device to implement. Such functionality is in 3GPP called "mandatory without capability signaling". In NR the wireless device may be called User Equipment (UE), for which reason the terms UE or wireless device may be used alternatingly in this disclosure. Also, there is a large degree of freedom for the wireless device to implement only a subset of the specified functionality. The UE therefor indicates via UE capability signaling to the network node, which in NR is called gNodeB (gNB), what functionality it supports and related limitations for said functions, such as maximum number of resources supported, maximum number of ports, frequency bands that may be used in combination etc. Such functionality is in 3GPP called "mandatory feature with capability parameter" or "optional feature with capability parameter". Definitions of these terms can be found in 3GPP TS 38.306, Version 17.0.0, March 2022, section 4.2.1.

A network software release comprises a number of commercial features targeting different use cases that a network operator might be interested in. Each feature comprises or is built up from one or more functions or functionality, where each function may be associated with one or more capabilities. There are numerous of possible example features, wherein some features worth mentioning are Voice over NR, Reciprocity-based beamforming, UE battery saving using bandwidth parts, discrete Fourier transform spread orthogonal frequency division multiplexing (DFTS-OFDM), etc. Normally in interoperability testing of a new feature, it is tested that the UE correctly supports the feature and reports its related capability or capabilities before commercially releasing the UE.

However, there is not a one-to-one mapping between a feature and capabilities. Several completely different features, implemented by different network vendors even, may rely on the same basic UE capability. However, exactly how the related functionality is used may differ substantially between different features.

As a result, it happens that legacy UEs already deployed in wireless communication networks have problems with certain functionality that the UE according to 3GPP specification and according to its reported UE capabilities shall support. In order to also be able to handle such legacy UEs today, the wireless communication network may need to adapt to such UEs, which can result in that more advanced UEs will not be able to use all features they should be able to and that the wireless communication network actually can provide, since the network node, in NR the gNB, is not able to distinguish between UEs that correctly support the functionality and UEs that do not. Hence, there exists a need for an improved way of matching features to actual UE constraints.

SUMMARY

It is an object of the invention to address at least some of the problems and issues outlined above. It is an object of embodiments of the invention to achieve an improved way of matching features to UE capabilities. It is a further object to achieve an improved way of understanding actual UE constraints and taking these constraints into account when interacting with the UE. It is possible to achieve these objects and others by using methods, network nodes and wireless devices as defined in the attached independent claims.

According to one aspect, a method is provided that is performed by a network node of a wireless communication network. The method comprises receiving, from a UE wirelessly connected to the network node, a chipset identifier indicating a type of chipset of the UE, determining, based on the received chipset identifier, how to handle the UE, and communicating with the UE according to the determination.

According to another aspect, a method is provided that is performed by a UE wirelessly connected to a network node of a wireless communication network. The method comprises sending, to the network node, a chipset identifier indicating a type of chipset of the UE thereby enabling the network node to determine how to handle the UE depending on the type of chipset of the UE.

According to another aspect, a network node is provided, which is configured to operate in a wireless communication network, the network node comprising a processing circuitry and a memory. Said memory contains instructions executable by said processing circuitry, whereby the network node is operative for receiving, from a UE wirelessly connected to the network node, a chipset identifier indicating a type of chipset of the UE, determining, based on the received chipset identifier, how to handle the UE, and communicating with the UE according to the determination.

According to another aspect, a UE is provided, which is configured for wireless communication with a network node of a wireless communication network, the UE comprising a processing circuitry and a memory. Said memory contains instructions executable by said processing circuitry, whereby the UE is operative for sending, to the network node, a chipset identifier indicating a type of chipset of the UE thereby enabling the network node to determine how to handle the UE depending on the type of chipset of the UE.

According to other aspects, computer programs and carriers are also provided, the details of which will be described in the claims and the detailed description.

Further possible features and benefits of this solution will become apparent from the detailed description below.

BRIEF DESCRIPTION OF DRAWINGS

The solution will now be described in more detail by means of exemplary embodiments and with reference to the accompanying drawings, in which.

DETAILED DESCRIPTION

Figure 1:
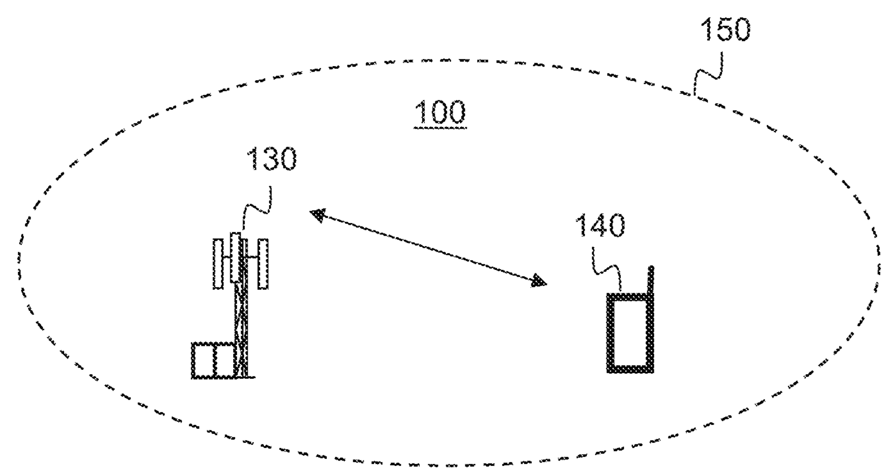
FIG. 1 is a schematic diagram of a wireless communication network in which the present invention may be used.

FIG. 1 shows a wireless communication network 100 comprising a radio access network (RAN) node aka network node 130 that is in, or is adapted for, wireless communication with a wireless communication device aka wireless device aka User Equipment (UE) 140. The network node 130 provides radio access in a cell 150 covering a geographical area.

The wireless communication network 100 may be any kind of wireless communication network that can provide radio access to wireless devices. Example of such wireless communication networks are networks based on Global System for Mobile communication (GSM), Enhanced Data Rates for GSM Evolution (EDGE), Universal Mobile Telecommunications System (UMTS), Code Division Multiple Access 2000 (CDMA 2000), Long Term Evolution (LTE), LTE Advanced, Wireless Local Area Networks (WLAN), Worldwide Interoperability for Microwave Access (WiMAX), WiMAX Advanced, as well as fifth generation (5G) wireless communication networks based on technology such as New Radio (NR), and any possible future sixth generation (6G) wireless communication network.

The network node 130 may be any kind of network node that can provide wireless access to a wireless device 140 alone or in combination with another network node. Examples of network nodes 130 are a base station (BS), a radio BS, a base transceiver station, a BS controller, a network controller, a Node B (NB), an evolved Node B (eNB), a gNodeB (gNB), a Multi-cell/multicast Coordination Entity, a relay node, an access point (AP), a radio AP, a remote radio unit (RRU), a remote radio head (RRH) and a multi-standard BS (MSR BS).

The wireless device 140 may be any type of device capable of wirelessly communicating with a network node 130 using radio signals. For example, the wireless device 140 may be a User Equipment (UE), a machine type UE or a UE capable of machine to machine (M2M) communication, a sensor, a tablet, a mobile terminal, a smart phone, a laptop embedded equipped (LEE), a laptop mounted equipment (LME), a USB dongle, a Customer Premises Equipment (CPE), an Internet of Things (IoT) device, etc.

As mentioned in the background, there is a problem that UEs already deployed in wireless communication networks have problems with certain functionality even though the UE according to the 3GPP specification and according to its reported UE capabilities shall support that functionality. When digging into this problem, the inventors discussed the fact that the vast majority of air interface-related functionality is implemented by vendors of UE chipsets, on which chipsets the UE device vendors build their UEs. Further, it happens regularly that UE chipsets are identified that do not work as expected, given the UE capability they report and what behavior the 3GPP specifications mandate for such UEs. Sometimes this happens in interoperability testing before the UE chipset is commercially released, in which case the UE chipset implementation is just corrected. However, it may also happen that UEs built on these problematic chipsets have already been released into commercial operation. It is very difficult to push software corrections to all impacted UEs, and this may stop introduction of new features since if the feature is activated in the network, then legacy UEs in commercial operation will start to experience problems. The problems may be related to a mandatory function that do not have any related capability signaling, or to functions that are related to capability signaling. It is close to impossible to guarantee in advance that a function will work as expected without actual test of the function. During interoperability testing, it happens commonly that some issues are found that require updates on UE side.

For special treatment of certain devices with erroneous implementation, IMEI-SV or TAC can be used for identification. However, this requires the operator to manage databases of all the different versions, which can be very complicated as there may be many different devices built on top of a single faulty UE chipset version. There is a strong reluctancy among operators to rely on International Mobile Equipment Identity-Software Version (IMEI-SV), or Type Allocation Code (TAC) to identify faulty devices.

Further, identification of UE chipsets based on their "capability fingerprints", i.e. certain combination of existing capability information elements (IEs) that are signaled by a specific chipset only, is becoming increasingly difficult as the number of chipset versions increase. Thus, it becomes very difficult or even impossible to clearly identify such capability fingerprints that are correctly identifying the UE to be of a certain type.

However, by storing rules on how to treat UEs based on the chipset type it is built on together with an identifier of the chipset type, and let the UE report its chipset type to the network side, it could be possible to adapt features to provide, or which features to provide, to a certain UE depending on the chipset type the UE is built on. This chipset type information and the rule may be used together with the regular UE capability information to improve the matching of features to UEs. A typical rule could be "A UE based on chipset type X shall not be configured with feature Y, no matter what the UE's capability information indicates". A rule may be created from reported problems of UEs built on certain chipsets. For example, for the rule above, if it has been reported that many UEs built on chipsets of type X gets high Block Error Rate (BLER) when configured with feature Y, a rule as mentioned above may be set up.

Consequently, by the UE reporting its chipset type to the network node, the network node can use this information to determine how to handle the UE. As a result, there may be a better way of determining which features should be implemented for which UEs.

Figure 2:
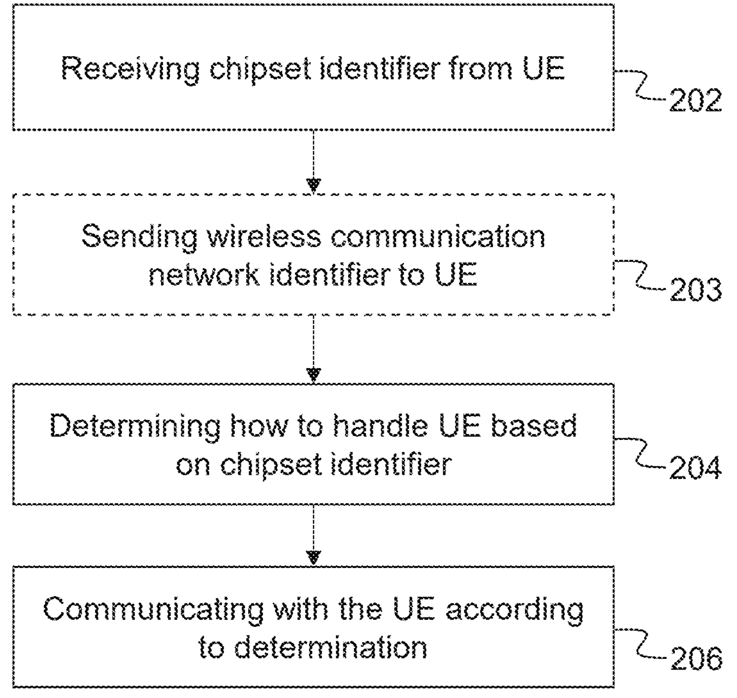
FIG. 2 is a flow chart illustrating a method performed by a network node, according to possible embodiments.

FIG. 2, in conjunction with FIG. 1, shows a method performed by a network node 130 of a wireless communication network 100. The method comprises receiving 202, from a UE 140 wirelessly connected to the network node 130, a chipset identifier indicating a type of chipset of the UE 140, determining 204, based on the received chipset identifier, how to handle the UE 140, and communicating 206 with the UE 140 according to the determination 204. By receiving an identifier indicating the chipset type the UE is built on, the network node can adapt its handling of the UE depending on the chipset type. For example, the network node can use the chipset identifier to determine that a feature should not be used for the communication with this UE. The network node can have access to rules or other types of information that instruct the network node how to handle the UE depending on the chipset type of the UE. Such rules could overrule any information of UE capabilities that the UE sends to the network node. As a result, indications of actual UE constraints that are not shown in regular UE capability information but depend on chipset type can be identified by the network node, so the network node can take these constraints into account when interacting with the UE.

According to an embodiment, the determining 204 comprises comparing the received chipset identifier to chipset identifiers stored in the wireless communication network together with information on any feature constraints for each stored chipset identifier, and determining, based on any such stored feature constraints for a chipset identifier of the stored chipset identifiers that matches the received chipset identifier, how to handle the UE 140. In other words, the network node takes the chipset identifier it receives, checks which chipset type it indicates and looks-up if there are any feature constraints stored for this chipset type. If there are any such constraints, the network node determines that the UE will not be provided with the feature for which there are constraints, or the UE may be provided with a limited version of the feature, in case the constraints allow a limited version. "A limited version" may be interpreted as a version of the feature having some restrictions to the original version of the feature. According to an embodiment, the information on any feature constraints for chipset identifiers/chipset types may be hardcoded in the network node. According to an embodiment, the feature constraints may be based on association of different chipset types to different UE groups. Then different behavior, i.e., allowed features for different UE groups, can be defined. The network operator can be allowed to determine which chipset types that belong to which UE groups.

According to an embodiment, the determination 204 is also based on one or more of UE capabilities, network node configuration and requirements of a certain feature.

According to another embodiment, the determination 204 comprises determining, based on the chipset identifier and requirements of a certain feature, whether to use the certain feature for the UE. Also, the communicating 206 further comprises selectively using the feature for the communication with the UE depending on the determination.

According to yet another embodiment, the determination 204 comprises determining, based on the chipset identifier, to avoid use of a feature for the UE, despite the UE having indicated that it has capabilities that support the feature.

According to another embodiment, the received chipset identifier comprises information on chipset vendor and one or more of hardware version and software version of the chipset.

According to yet another embodiment, the chipset identifier is received 202 in a UE capability information message, which UE capability information message further comprises standardized information of the UE capabilities. The standardized information of the UE capabilities may be the information described in TS 38.331 Version 17.0.0, section 6.3.3, wherein the definition of the UE capabilities is described in 3GPP TS 38.306. The UE capability information message may be sent as a Radio Resource Control (RRC) Message. The UE capability information message may comprise one or more capability containers containing the information of the UE capabilities. The one or more capability containers may be one or more of UE-EUTRA-Capability, UE-NR-Capability, UE-MRDC-Capability. EUTRA stands for Evolved Universal Terrestrial Radio Access. MRDC stands for Multi-RAT Dual Connectivity.

According to still another embodiment, the UE capability information message comprises a first field indicating whether the chipset identifier is present in the UE capability information message and a second field comprising the chipset identifier.

According to another embodiment, the UE capability information message is a standardized UE capability information message, and the chipset identifier is received 202 in one or more Information elements (IEs) indicated as dummy field in the standardized UE capability information message. In RRC there exists some "dummy field" capability IEs that have been deprecated, e.g. due to 3GPP RAN2 realizing that they were added to the wrong place in the capability structure, or due to initial misunderstanding of what capabilities that need to be defined. Such dummy field IEs are still part of the specification, but there is no specified behavior related to them. A UE is allowed to send them, and the gNB must accept that the Abstract Syntax Notation 1 (ASN1) received from UE may contain them. The inventors have realized that it would be efficient usage of communication resources to use such dummy fields for sending the chipset identifier.

According to yet another embodiment, the first field of the UE capability information message is a mac-Parameters-Common/dummy Information Element, IE, and the second field of the UE capability information message is a mimo-ParametersPerBand/dummy4 IE.

According to another embodiment, the method further comprises sending 203 an identifier of the network node to the UE 140 only when the chipset identifier has been received 202. The UE 140 may also benefit from knowing what type of network node it is communicating with so that the UE may adapt its behavior to the network node type. E.g., the UE may adapt its channel state information (CSI) feedback to fit the network node's link adaptation algorithms. Certain RRC configuration IEs sent by the network node may be used to convey the network node identifier, e.g. dummy field IEs. However, using RRC configuration IEs sent to the UE to convey the network node identifier may be problematic, as there are not many dummy field configuration IEs, and there is always a risk involved in changing the configuration signaling towards legacy UEs. One solution to this problem is to ensure through testing that all UEs that do send a chipset identifier also can understand the network node identifier, and then let the network node only send the network node identifier as part of a configuration message to UEs that have included a chipset identifier in their capability signaling. The network node identifier may define one or more of: network node supplier or manufacturer, type of network node, software release version, etc.

Figure 3:
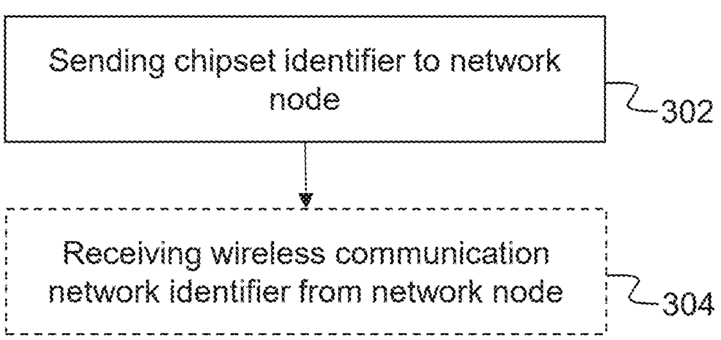
FIG. 3 is a flow chart illustrating a method performed by a wireless device, according to possible embodiments.

FIG. 3, in conjunction with FIG. 1, shows a method performed by a UE 140 wirelessly connected to a network node 130 of a wireless communication network 100. The method comprises sending 302, to the network node 130, a chipset identifier indicating a type of chipset of the UE 140 thereby enabling the network node 130 to determine how to handle the UE 140 depending on the type of chipset of the UE.

According to an embodiment, the chipset identifier comprises information on chipset vendor and one or more of hardware version and software version of the chipset.

According to another embodiment, the chipset identifier is sent 302 in a UE capability information message, the UE capability information message further comprising standardized information of the UE capabilities.

According to another embodiment, the UE capability information message comprises a first field indicating whether the chipset identifier is present in the UE capability information message and a second field comprising the chipset identifier.

According to yet another embodiment, the UE capability information message is a standardized UE capability information message. Further, the chipset identifier is sent 302 in one or more IEs indicated as dummy field(s) in the standardized UE capability information message.

According to yet another embodiment, the first field of the UE capability information message is a mac-Parameters-Common/dummy IE, and the second field of the UE capability information message is a mimo-ParametersPerBand/dummy4 IE.

According to another embodiment, the method further comprises receiving 304 a network node identifier from the network node 130 only when the chipset identifier has been sent 302.

Figure 4:
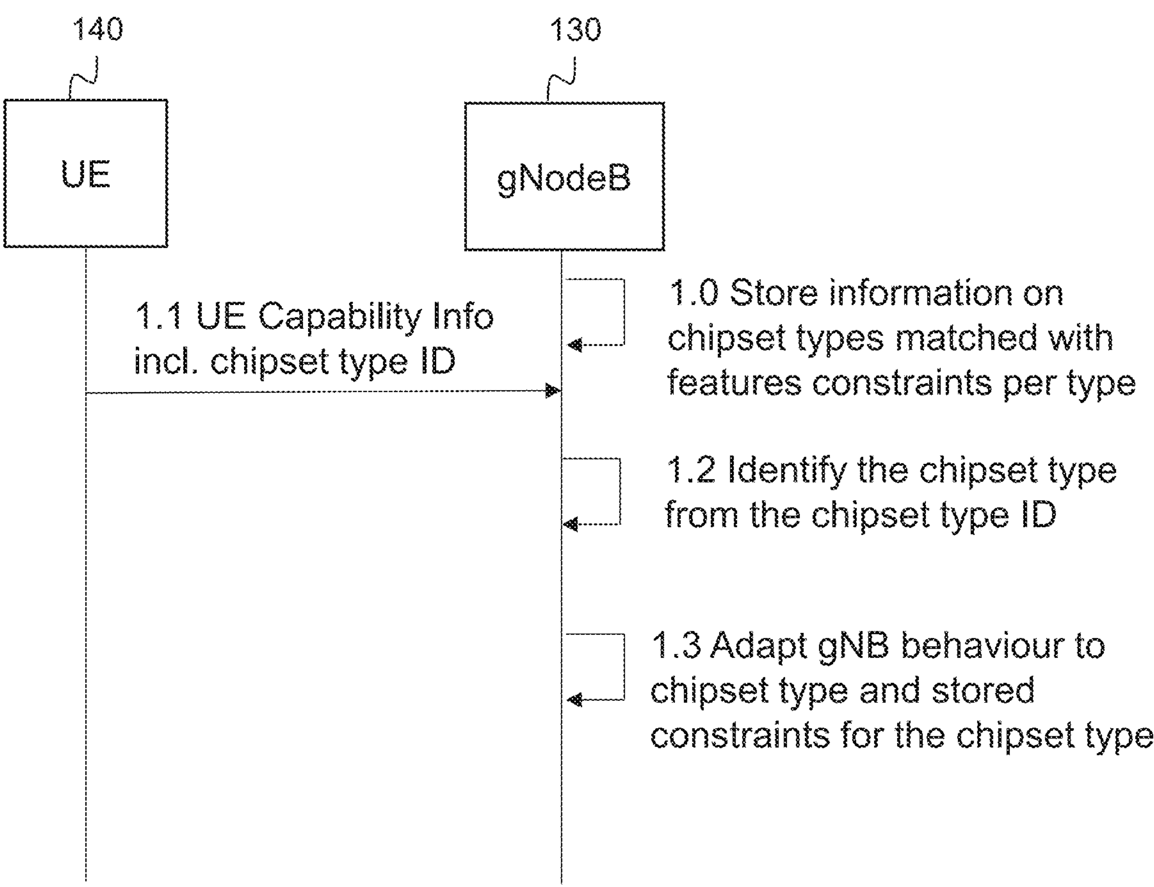
FIG. 4 is a signaling diagram illustrating an embodiment of a procedure according to further possible embodiments.

FIG. 4 illustrates embodiments of a procedure for handling UEs having different capabilities by a UE informing a network node of its chipset type. The procedure of FIG. 4 is shown for an NR network, and therefore NR terminology is used, however, the procedure is easily adapted to other wireless network technologies. The procedure starts by the UE 140 sending 1.1 a UE chipset identifier to the gNodeB (gNB) 130. The chipset identifier indicates the chipset type onto which the UE 140 is built. The chipset identifier is included in existing signaling of UE capabilities from the UE 140 to the network node 130, e.g., included in capability containers within a UECapabilityInformation message sent over RRC.

According to an embodiment, the chipset identifier has the following format: "ChipsetIdentifier={vendor, major, minor}", wherein "vendor"=chipset vendor, "major"=major variant of chipset, such as hardware (HW) generation and/or major software (SW) release, and "minor"=minor variant of chipset, such as bug-fix level on top of major SW release. Detailed usage of major/minor fields may be up to chipset or UE vendors to decide, but vendor identifier needs ecosystem alignment so that different vendors use unique identifiers.

Dummy field capability IEs that are available in existing standards, such as 3GPP TS 38.331, can be used to convey the chipset identifier. Examples of useable dummy field capability IEs that are part of the UE-NR-Capability container are: "mac-ParametersCommon/dummy", previously named "pucch-SpatialRelInfoMAC-CE" and "mimo-ParametersPerBand/dummy4", previously named "csi-RS-ForTracking". The "mimo-ParametersPerBand/dummy4" has the following contents: burstLength INTEGER (1 . . . 2), maxSimultaneousResourceSetsPerCC INTEGER (1 . . . 8), maxConfiguredResourceSetsPerCC INTEGER (1 . . . 64), and maxConfiguredResourceSetsAllCC INTEGER (1 . . . 128).

No known UE reports anything in the IE "mac-ParametersCommon/dummy", so presence of this IE can be used to indicate that the UE 140 is signaling a chipset identifier in the IEs "mimo-ParametersPerBand/dummy4". In other words, presence of the IE "mac-ParametersCommon/dummy" indicates that there is a chipset identifier in the IEs "mimo-ParametersPerBand/dummy4".

There are other dummy field IEs that may be used for the same purpose. However, some of the other dummy field IEs are reported by some early UEs and are hence more difficult to rely on.

The above-mentioned IEs can be used by the UE 140 to send a chipset identifier to the gNB 140 by 1. including the IE "mac-ParametersCommon/dummy" to indicate that a chipset identifier is sent in the message, and 2. define the chipset identifier in the IE "mimo-ParametersPerBand/dummy4" (or other equivalent IEs).

According to an embodiment, the IE "mimo-ParametersPerBand/dummy4" is included in at least the first BandNR instance in supportedBandListNR. Further, the values of the contained IEs reflect the chipset identifier {vendor, major, minor}, where vendor=(burstLength−1)*8+dummy4/maxSimultaneousResourceSetsPerCC (16 values), major=dummy4/maxConfiguredResourceSetsPerCC (64 values) and minor=dummy4/maxConfiguredResourceSetsAllCC (128 values).

The gNB 140 has access to information of chipset type identifiers stored 1.0 together with feature constraints per chipset type. In other words, there is a storage where a certain chipset type is connected with feature constraints. Such chipset type-feature constraints connections have been stored 1.0 before the chipset type identifier is sent 1.1 to the gNB 140. Hereby, the gNB 140, when getting to know of a chipset type, can obtain feature constraint information for the certain chipset type. The feature constraints-chipset type connections may be hardcoded in the gNB 140 or they may be stored in a storage in which the gNB can easily obtain them.

After receiving 1.1 the UE capability container including the chipset type identifier, the UE chipset type is identified 1.2 by the gNB from the chipset type identifier. For UEs that do not signal chipset identifier, it is assumed that chipset identifier=UNKNOWN.

Given the chipset identifier, and possibly also UE capabilities, gNB configuration and feature activation, the gNB 130 behavior for handling the UE 140 can be adapted 1.3 to take the chipset identifier value into account. On high level this may include one or more of: blocking configuration of a feature for the UE 140 based on its chipset identifier and the information stored for the chipset identifier; allowing configuration of a feature for the UE 140 based on its chipset; adapting detailed configuration of a feature for the UE 140 based on its chipset, and adapting the dynamic interaction, such as scheduling and link adaptation, with the UE 140 based on its chipset.

Examples of possible adaption 1.3 of gNB behavior for handling the UE when using the chipset identifier {vendor, major, minor} are:

- Overriding a capability IE capX that is used for determining if feature X can be configured
  - If "vendor" == 3 and "major" <= 5 then feature X cannot be -continued

- configured even if UE indicates support for capX;
  - If "vendor" == 4 and "major" == 14 and 10 <= "minor" <= 22 then feature X cannot be configured even if UE indicates support for capX;
  - If "chipsetIdentifier" == UNKNOWN then feature X cannot be configured even if UE indicates support for capX;
  - If "vendor" == 5 and 7 <= "major" <= 12 and UE indicates support for capX then feature X can be configured with adaptation that parameter Y must be set to 2;
  - If "vendor" == 7 and "major" <= 8 then capX shall be assumed to have value 4 instead of the signaled capability value;
- Adapting gNB behavior to avoid problem with mandatory features without capability IE
  - If "vendor" == 2 and "major" <= 3 then do not configure feature Y
  - If "vendor" == 3 and "major" <= 4 then adapt the link adaptation to be more conservative when determining the MCS.

Note that it is not necessary to let the chipset identifier influence the configuration of a certain feature. If there are no known interoperability issues with the feature, the feature can be configured based on regular rules, e.g., if the feature is activated in the network and if the UE supports the associated capability. However, if interoperability problems are identified, then the chipset identifier can become part of the criteria for when and how to configure the feature.

According to an embodiment, gNB behavior may be hard coded for different chipset identifiers in the gNB implementation.

According to another embodiment, it may be possible to define different UE groups with different behavior, and let the chipset identifier decide which of the UE groups a particular UE should be placed in. The network operators may be allowed to define the UE groups. For example, the following two UE groups can be defined: "UEs that shall be configured with feature X according to normal rules" and "UEs that shall never be configured with feature X". Then rules for which chipsets that belong in each UE group can be defined. The gNB 130 will then act according to the rules defined for the relevant UE group when configuring feature X for a certain UE 140. This allows the operator to have the final say on what rules to apply. E.g., maybe there are different UEs that all signal the same chipset identifier but only a subset of those UEs has a problem with a certain feature. One operator may have many problematic UEs in its network and may want to disable the feature for this chipset identifier value, while another operator has no or very few such problematic devices in its network and is better off having the feature activated.

Figure 5:
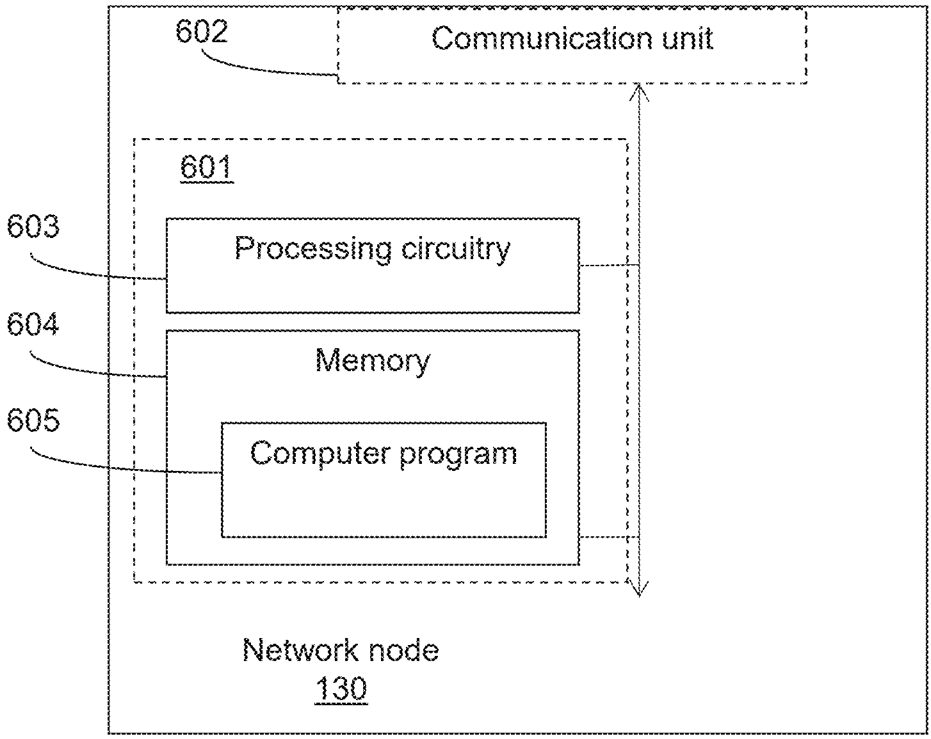
FIG. 5 is a block diagram illustrating a network node in more detail, according to further possible embodiments.

FIG. 5, in conjunction with FIG. 1 describes a network node 130 configured to operate in a wireless communication network 100, the network node 130 comprising a processing circuitry 603 and a memory 604. Said memory 604 contains instructions executable by said processing circuitry, whereby the network node 130 is operative for receiving, from a UE 140 wirelessly connected to the network node 130, a chipset identifier indicating a type of chipset of the UE 140, determining, based on the received chipset identifier, how to handle the UE 140, and communicating with the UE 140 according to the determination.

According to an embodiment, the network node 130 is operative for the determining of how to handle the UE 140 by comparing the received chipset identifier to chipset identifiers stored in the wireless communication network together with information on any feature constraints for each stored chipset identifier, and determining, based on any stored feature constraints for a chipset identifier of the stored chipset identifiers that matches the received chipset identifier, how to handle the UE 140.

According to another embodiment, the network node 130 is operative for the determining of how to handle the UE 140 also based on one or more of UE capabilities, network node configuration and requirements of a certain feature.

According to another embodiment, the network node 130 is operative for the determining of how to handle the UE 140 by determining, based on the chipset identifier and requirements of a certain feature, whether to use the certain feature for the UE, and operative for the communicating with the UE by selectively using the feature for the communication with the UE depending on the determination.

According to yet another embodiment, the network node 130 is operative for the determining of how to handle the UE 140 by determining, based on the chipset identifier, to avoid use of a feature for the UE, despite the UE having indicated it has a capability that supports the feature.

According to another embodiment, the received chipset identifier comprises information on chipset vendor and one or more of hardware version and software version of the chipset.

According to yet another embodiment, the network node 130 is operative for the receiving of the chipset identifier by receiving the chipset identifier in a UE capability information message, which UE capability information message further comprises standardized information of the UE capabilities.

According to yet another embodiment, the UE capability information message comprises a first field indicating whether the chipset identifier is present in the UE capability information message and a second field comprising the chipset identifier.

According to still another embodiment, the UE capability information message is a standardized UE capability information message. Further, the network node is operative for receiving the chipset identifier in one or more Information Elements, IE, indicated as dummy field in the standardized UE capability information message.

According to another embodiment, the first field of the UE capability information message is a mac-ParametersCommon/dummy Information Element, IE, and the second field of the UE capability information message is a mimo-ParametersPerBand/dummy4 IE.

According to yet another embodiment, the network node 130 is further operative for sending an identifier of the network node to the UE 140 only when the chipset identifier has been received.

According to other embodiments, the network node 130 may further comprise a communication unit 602, which may be considered to comprise conventional means for wireless communication with the wireless device 140, such as a transceiver for wireless transmission and reception of signals in the communication network. The communication unit 602 may also comprise conventional means for communication with other network nodes of the wireless communication network 100. The instructions executable by said processing circuitry 603 may be arranged as a computer program 605 stored e.g. in said memory 604. The processing circuitry 603 and the memory 604 may be arranged in a sub-arrangement 601. The sub-arrangement 601 may be a micro-processor and adequate software and storage therefore, a Programmable Logic Device, PLD, or other electronic component(s)/processing circuit(s) configured to perform the methods mentioned above. The processing circuitry 603 may comprise one or more programmable processor, application-specific integrated circuits, field programmable gate arrays or combinations of these adapted to execute instructions.

The computer program 605 may be arranged such that when its instructions are run in the processing circuitry, they cause the network node 130 to perform the steps described in any of the described embodiments of the network node 130 and its method. The computer program 605 may be carried by a computer program product connectable to the processing circuitry 603. The computer program product may be the memory 604, or at least arranged in the memory. The memory 604 may be realized as for example a RAM (Random-access memory), ROM (Read-Only Memory) or an EEPROM (Electrical Erasable Programmable ROM). In some embodiments, a carrier may contain the computer program 605. The carrier may be one of an electronic signal, an optical signal, an electromagnetic signal, a magnetic signal, an electric signal, a radio signal, a microwave signal, or computer readable storage medium. The computer-readable storage medium may be e.g. a CD, DVD or flash memory, from which the program could be downloaded into the memory 604. Alternatively, the computer program may be stored on a server or any other entity to which the network node 130 has access via the communication unit 602. The computer program 605 may then be downloaded from the server into the memory 604.

Figure 6:
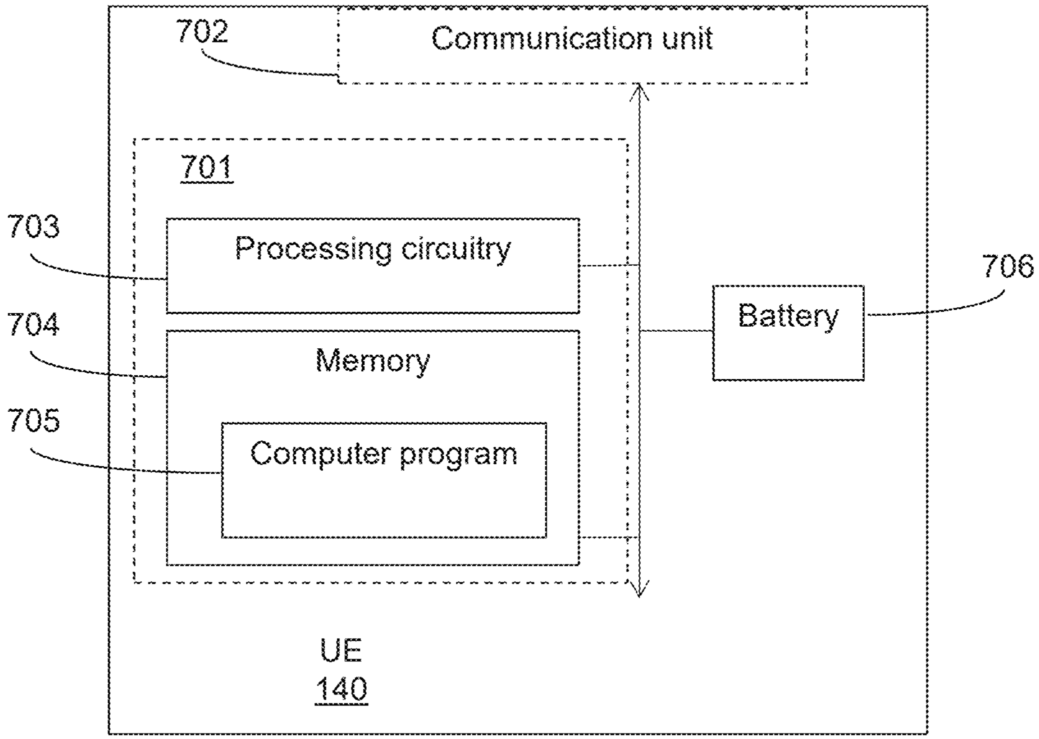
FIG. 6 is a block diagram illustrating a UE in more detail, according to further possible embodiments.

FIG. 6, in conjunction with FIG. 1 describes a UE 140 configured for wireless communication with a network node 130 of a wireless communication network 100, the UE 140 comprising a processing circuitry 703 and a memory 704. Said memory 704 contains instructions executable by said processing circuitry 703, whereby the UE 140 is operative for sending, to the network node 130, a chipset identifier indicating a type of chipset of the UE 140 thereby enabling the network node 130 to determine how to handle the UE 140 depending on the type of chipset of the UE.

According to an embodiment, the chipset identifier comprises information on chipset vendor and one or more of hardware version and software version of the chipset.

According to another embodiment, the UE 140 is operative for sending the chipset identifier in a UE capability information message, the UE capability information message further comprising standardized information of the UE capabilities.

According to another embodiment, the UE capability information message comprises a first field indicating whether the chipset identifier is present in the UE capability information message and a second field comprising the chipset identifier.

According to yet another embodiment, the UE capability information message is a standardized UE capability information message. Further, the UE 140 is operative for sending the chipset identifier in one or more IEs indicated as dummy field in the standardized UE capability information message.

According to another embodiment, the first field of the UE capability information message is a mac-ParametersCommon/dummy Information Element, IE, and the second field of the UE capability information message is a mimo-ParametersPerBand/dummy4 IE.

According to yet another embodiment, the UE 140 is further operative for receiving a network node identifier from the network node 130 only when the chipset identifier has been sent.

According to other embodiments, the UE 140 may further comprise a communication unit 702, which may be considered to comprise conventional means for wireless communication with the network node 130, such as a transceiver for wireless transmission and reception of signals. The instructions executable by said processing circuitry 703 may be arranged as a computer program 705 stored e.g. in said memory 704. The processing circuitry 703 and the memory 704 may be arranged in a sub-arrangement 701. The sub-arrangement 701 may be a micro-processor and adequate software and storage therefore, a Programmable Logic Device, PLD, or other electronic component(s)/processing circuit(s) configured to perform the methods mentioned above. The processing circuitry 703 may comprise one or more programmable processor, application-specific integrated circuits, field programmable gate arrays or combinations of these adapted to execute instructions. The UE 140 may further comprise a battery 706 for providing electrical power to the UE.

The computer program 705 may be arranged such that when its instructions are run in the processing circuitry, they cause the UE 140 to perform the steps described in any of the described embodiments of the UE 140 and its method. The computer program 705 may be carried by a computer program product connectable to the processing circuitry 703. The computer program product may be the memory 704, or at least arranged in the memory. The memory 704 may be realized as for example a RAM (Random-access memory), ROM (Read-Only Memory) or an EEPROM (Electrical Erasable Programmable ROM). In some embodiments, a carrier may contain the computer program 705. The carrier may be one of an electronic signal, an optical signal, an electromagnetic signal, a magnetic signal, an electric signal, a radio signal, a microwave signal, or computer readable storage medium. The computer-readable storage medium may be e.g. a CD, DVD or flash memory, from which the program could be downloaded into the memory 704. Alternatively, the computer program may be stored on a server or any other entity to which the UE 140 has access via the communication unit 702. The computer program 705 may then be downloaded from the server into the memory 704.

Although the description above contains a plurality of specificities, these should not be construed as limiting the scope of the concept described herein but as merely providing illustrations of some exemplifying embodiments of the described concept. It will be appreciated that the scope of the presently described concept fully encompasses other embodiments which may become obvious to those skilled in the art, and that the scope of the presently described concept is accordingly not to be limited. Reference to an element in the singular is not intended to mean "one and only one"

unless explicitly so stated, but rather "one or more." All structural and functional equivalents to the elements of the above-described embodiments that are known to those of ordinary skill in the art are expressly incorporated herein by reference and are intended to be encompassed hereby. Moreover, it is not necessary for an apparatus or method to address each and every problem sought to be solved by the presently described concept, for it to be encompassed hereby. In the exemplary figures, a broken line generally signifies that the feature within the broken line is optional.

What is claimed is:

1. A method performed by a network node of a wireless communication network, the method comprising:

receiving, from a user equipment (UE) wirelessly connected to the network node, a UE capability information message that includes a plurality of information elements that carry standardized information indicating one or more UE capabilities, wherein the plurality of information elements further carry a chipset identifier indicating a type of chipset of the UE;

determining, based on the received chipset identifier, whether to use one or more features associated with the one or more UE capabilities; and communicating with the UE based on the determination.

2. The method of claim 1, wherein determining whether to use the one or more features comprises determining whether the received chipset identifier is associated with any feature constraints.

3. The method of claim 1, wherein determining whether to use the one or more features is further based on one or more of the one or more UE capabilities, a configuration of the network node, or requirements of the one or more features.

4. The method of claim 1, wherein determining whether to use the one or more features comprises determining that a first feature included in the one or more features should not be used, and wherein communicating with the UE based on the determination comprises communicating with the UE without using the first feature, despite the standardized information indicating that the UE has a capability that supports the first feature.

5. The method of claim 1, wherein determining whether to use the one or more features comprises determining, based on the chipset identifier and the requirements of a first feature included in the one or more features, that a limited version of the first feature should be used, and where communicating with the UE based on the determination comprises communicating with the UE with a limited version of the first feature.

6. The method of claim 1, wherein determining whether to use the one or more features comprises determining a relevant UE group for the UE, from a plurality of UE groups, based on the received chipset identifier, wherein the relevant UE group is associated with at least a first rule for whether to use a first feature included in the one or more features.

7. The method of claim 1 further comprising transmitting a network node identifier of the network node to the UE.

8. A method performed by a network node of a wireless communication network, the method comprising:

receiving, from a user equipment (UE), a UE capability information message that includes a plurality of information elements that carry standardized information indicating one or more UE capabilities, wherein the plurality of information elements further carry a chipset identifier indicating a type of chipset of the UE, wherein a first set of one or more features are associated with the standardized information and a second set of one or more features are associated with the type of chipset of the UE.

9. The method of claim 8, wherein the chipset identifier comprises information on a chipset vendor and at least one of a hardware version or a software version of the chipset.

10. The method of claim 8, wherein the UE capability information message comprises a first field that indicates whether the chipset identifier is present in the UE capability information message and a second field that comprises the chipset identifier.

11. The method of claim 10, wherein the first field is a mac-ParametersCommon/dummy information element (IE) and the second field is a mimo-ParametersPerBand/dummy4 information element.

12. The method of claim 8, wherein the UE capability information message is a standardized UE capability information message, and wherein the chipset identifier is included in one or more information elements (IE) indicated as a dummy field in the standardized UE capability information message.

13. The method of claim 8, the method further comprising:

determining how to handle the first set of one or more features associated with the one or more UE capabilities based on the second set of one or more features associated with the type of chipset of the UE; and communicating with the UE based on the determination.

14. The method of claim 8, the method further comprising transmitting a network node identifier of the network node to the UE.

15. A method performed by a user equipment (UE) wirelessly connected to a network node of a wireless communication network, the method comprising:

sending, to the network node, a UE capability information message that includes a plurality of information elements that carry standardized information indicating one or more UE capabilities, wherein the plurality of information elements further carry a chipset identifier indicating a type of chipset of the UE, wherein a first set of one or more features are associated with the standardized information and a second set of one or more features are associated with the type of chipset of the UE.

16. The method of claim 15, wherein the chipset identifier comprises information on a chipset vendor and at least one of a hardware version or a software version of the chipset.

17. The method of claim 15, wherein the UE capability information message comprises a first field that indicates whether the chipset identifier is present in the UE capability information message and a second field that comprises the chipset identifier.

18. The method of claim 17, wherein the first field is a mac-ParametersCommon/dummy information element (IE) and the second field is a mimo-ParametersPerBand/dummy4 information element.

19. The method of claim 15, wherein the UE capability information message is a standardized UE capability information message, and wherein the chipset identifier is included in one or more information elements (IE) indicated as a dummy field in the standardized UE capability information message.

20. The method of claim 15, the method further comprising receiving a network node identifier from the network node.

* * * * *